United States Patent
Nickel et al.

(12) 
(10) Patent No.: US 6,437,104 B1
(45) Date of Patent: Aug. 20, 2002

(54) PREPARATION OF DISAZO CONDENSATION PIGMENTS IN MICROREACTORS

(75) Inventors: Uwe Nickel, Bad Homburg; Klaus Kund, Langenscheid; Frank Alfter, Bad Soden, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/894,342

(22) Filed: Jun. 28, 2001

(30) Foreign Application Priority Data

Jul. 1, 2000 (DE) .......................... 100 32 019

(51) Int. Cl.[7] ............................... C09B 41/00
(52) U.S. Cl. ................ 534/582; 534/565; 534/598; 534/745; 534/748; 534/820
(58) Field of Search ................ 534/565, 582, 534/598, 745, 748, 820

(56) References Cited

U.S. PATENT DOCUMENTS

| | | | |
|---|---|---|---|
| 5,534,328 A | * | 7/1996 | Ashmead et al. ........... 428/166 |
| 5,811,062 A | * | 9/1998 | Wegeng et al. ............. 422/129 |
| 2001/0029294 A1 | * | 10/2001 | Nickel et al. .............. 534/692 |

FOREIGN PATENT DOCUMENTS

| DE | 1 544 453 | | 4/1970 |
|---|---|---|---|
| DE | 1644117 | | 10/1970 |
| DE | 2 462 57 | | 6/1987 |
| DE | 3 926 466 | | 2/1991 |
| GB | 1066769 | * | 4/1967 |
| GB | 1143727 | | 2/1969 |

OTHER PUBLICATIONS

Nickel et al., Chemical Abstracts, 135:167969, 2001.*

U.S. patent application Ser. No. 09/972,102, filed Oct. 5, 2001, Dietz, et al.

English Abstract Translation for DD 246257, Jun. 1987.

English Abstract Translation for DE 3926466, Feb. 1991.

U.S. patent application Ser. No. 09/780,218, filed Feb. 9, 2001.

* cited by examiner

*Primary Examiner*—Fiona T. Powers
(74) *Attorney, Agent, or Firm*—Anthony A. Bisulca

(57) ABSTRACT

A process for preparing disazo condensation pigments by diazotization of an aromatic amine, azo coupling with a coupling component to form an azocarboxylic acid or azodicarboxylic acid, formation of an azocarbonyl chloride or azodicarbonyl dichloride and condensation of the azocarbonyl chloride with an aromatic diamine or of the azodicarbonyl dichloride with an aromatic amine comprises effecting the acyl chloride formation and/or the condensation and optionally the diazotization and optionally the azo coupling in a microreactor.

12 Claims, 1 Drawing Sheet

PREPARATION OF DISAZO CONDENSATION PIGMENTS IN MICROREACTORS

BACKGROUND OF THE INVENTION

The present invention relates to the art of disazo condensation pigments. Disazo condensation pigments are compounds formed from two monoazo compounds which are linked by an aromatic diaminocarboxamide bridge. Disazo condensation pigments are traditionally produced in industry in a multistep batch process in tank reactors by mixing the reactants together in an aqueous phase or in solvents depending on the reaction step.

An alternative process comprises continuously mixing the suspensions or solutions of aqueous alkaline coupling component with aqueous acidic diazo component in mixing nozzles (DE-A-1 644 117, DE-A-1 544 453) as final reaction step.

The principal steps in the preparation of disazo condensation pigments are the diazotization of aromatic or hetaromatic amines, the azo coupling reaction and, typical of this class of pigments, the acyl chloride formation of aromatic mono- or dicarboxylic acids with subsequent condensation with aromatic mono- or diamines. The order of the reaction steps can vary. For instance, a diazotized aromatic amine and 2-hydroxynaphthalene-3-carboxylic acid may be coupled to obtain a monoazocarboxylic acid which, after conversion into the carbonyl chloride, is condensed with a diamine. Or two equivalents of a diazotized aromatic aminocarboxylic acid are coupled with a bis-coupler to obtain a disazodicarboxylic acid which, after conversion to the dicarbonyl chloride, is condensed with two equivalents of an aromatic amine. A further variation is the condensation of two equivalents of 2-hydroxynaphthalene-3-carbonyl chloride with an aromatic diamine and subsequent coupling with diazotized amine to form the disazo condensation pigment.

Disazo condensation pigments may need an aftertreatment in water/solvents to obtain the desired crystal properties.

In all these processes, it is essential that the process parameters, such as temperature, time and especially the degree of mixing, be controlled, if the products are to be pure and of high and consistent quality. One problem with these processes is taking new products from the laboratory scale to the large industrial scale.

It is an object of the present invention to provide a process for preparing disazo condensation pigments that provides optimal control of the process parameters, ensures improved mixing of the reactants and simplifies scaleup.

DD 246 257 A1 discloses the possibility of using miniaturized apparatuses for chemical reactions where the chemical entities to be treated are only available in small quantities or are very costly, so that large dead spaces in the equipment become unaffordable.

DE 3 926 466 C2 describes highly exothermic chemical reactions of two chemical entities in a microreactor.

Microreactors for conducting chemical reactions are constructed from stacks of grooved plates and are described in DE 39 26 466 C2 and U.S. Pat. No. 5,534,328. It is pointed out in U.S. Pat. No. 5,811,062 that microchannel reactors are preferably used for reactions that do not require or produce materials or solids that would clog the microchannels.

SUMMARY OF THE INVENTION

It has now been found that, surprisingly, microreactors are useful for effecting the diazotization, the azo coupling, the carbonyl chloride formation and the condensation reaction of the carbonyl chloride with an amine to prepare disazo condensation pigments.

As used herein, the term "microreactor" comprehends micro- and minireactors, which differ only by reason of the dimensions and construction of the reaction channel structures.

It is possible to use, for example, microreactors as known from the cited references or from publications of the Institut für Mikrotechnik Mainz GmbH, Germany, or else commercially available microreactors, for example Selecto™ (based on Cytos™) from Cellular Process Chemistry GmbH, Frankfurt/Main.

The invention accordingly provides a process for preparing disazo condensation pigments by diazotization of an aromatic amine, azo coupling with a coupling component to form an azocarboxylic acid or azodicarboxylic acid, formation of an azocarbonyl chloride or azodicarbonyl dichloride and condensation of the azocarbonyl chloride with an aromatic diamine or of the azodicarbonyl dichloride with an aromatic amine, which comprises effecting the acyl chloride formation and/or the condensation and optionally the diazotization and optionally the azo coupling in a microreactor.

Advantageously, the starting materials dissolved or suspended in a solvent are preferably fed to the microreactor continuously and preferably in equivalent or, if appropriate, doubly equivalent amounts. Not only reaction catalysts but also classic pigment preparation process assistants, such as resins, surfactants and other additives may likewise be used in the process of the invention.

DESCRIPTION OF THE PREFERRED EMBODIMENTS

Figure 1:
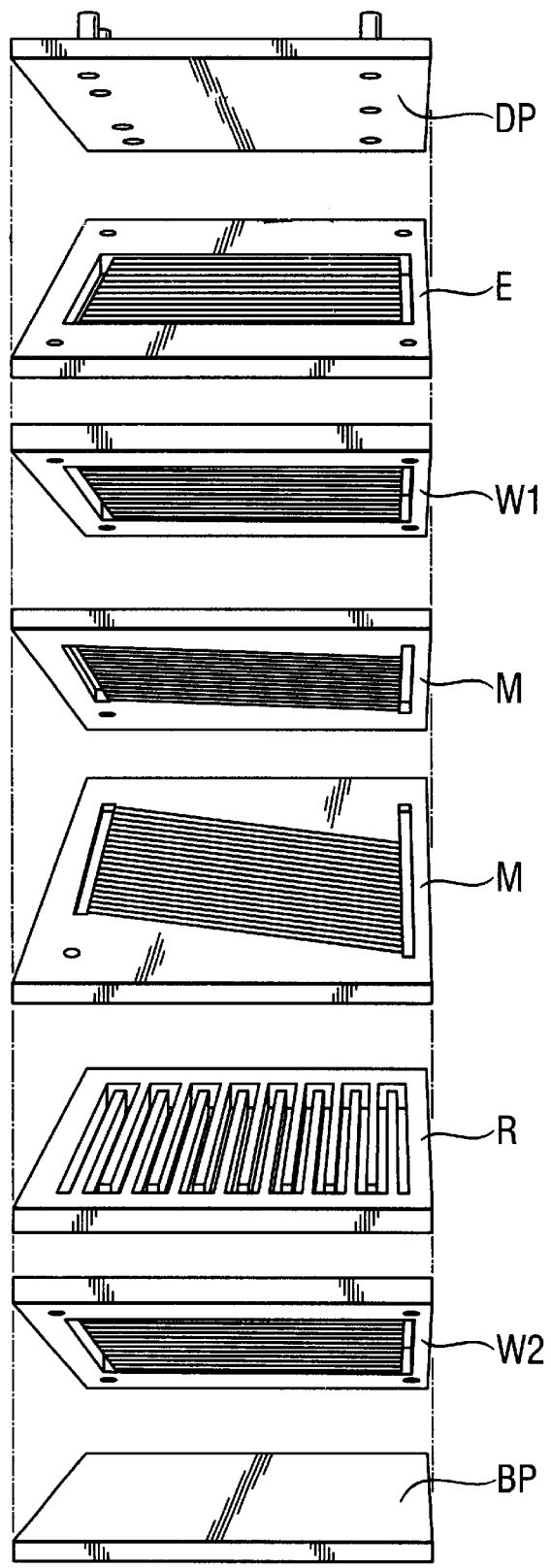
FIG. 1 is an exploded view of a microreactor for preparing disazo condensation pigments, according to the present invention.

The disazo condensation pigments prepared according to the invention conform to the formulae (1) or (2)

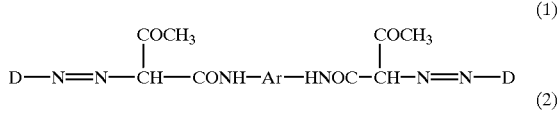

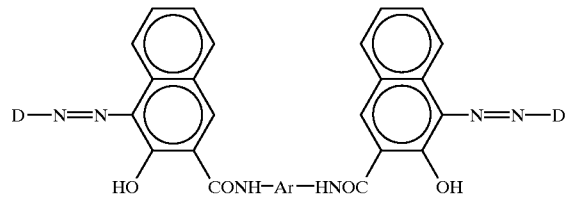

where

D is a radical of a diazo component and

Ar is an aromatic radical.

D is for example a radical of the formula (a) or (b)

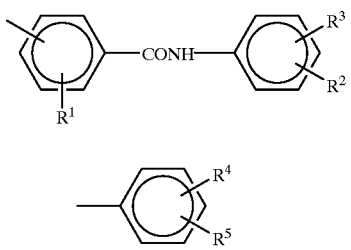

where
R$^1$, R$^2$ and R$^3$ are identical or different and are each selected from the group consisting of hydrogen, methyl, chlorine, CF$_3$ and 4'-chlorophenoxy; R$^4$ and R$^5$ are identical or different and are each selected from the group of hydrogen, chlorine, methyl, CF$_3$, COOCH$_2$CH$_2$Cl, COO(C$_1$–C$_4$)alkyl and nitro.

Ar is for example:
1,4-phenylene, 2-chloro-5-methyl-1,4-phenylene, 2,5-dichloro-1,4-phenylene,
2,5-dimethyl-1,4-phenylene, 2-chloro-1,4-phenylene, 2,2'-dichloro-1,4-biphenylene,
benzanilide-4,4'-diyl, 1,4-biphenylylene or 1,4-naphthylene.

Examples of diazo components are 2-chloroaniline, 2,5-dichloroaniline, 2,3-dichloro-aniline, 2-nitro-4-chloroaniline, 2-chloro-5-trifluoromethylaniline, isopropyl 3-amino-4-chlorobenzoate, 2-chloroethyl 3-amino-4-methylbenzoate, diisopropyl 2-aminoterephthalate; 3-amino-4-chloro-benzoic acid.

Examples of coupling components are: 2-hydroxynaphthalene-3-carboxylic acid;
1-chloro-2,5-bisacetoacetylamino-4-methylbenzene, 1,4-dichloro-2,5-bisacetoacetylaminobenzene and 1,4-dimethyl-2,5-bisacetoacetylaminobenzene.

Contemplated disazo condensation pigments include in particular C.I. Pigment Yellow 93, 94, 95, 128,166; C.I. Pigment Orange 31, 55; C.I. Pigment Red 139,140,141,143, 144,166,214,217,218,220, 221,242,248,262; C.I. Pigment Brown 23 and 42.

The diazotization of the diazo component can be effected in a conventional manner.

When the diazotization is carried out in a microreactor, the amine to be diazotized or its ammonium salt, preferably its hydrochloride or sulfate, is preferably dissolved or suspended in water and/or an organic solvent and the solution or suspension obtained is continuously introduced into the microreactor (reactant stream A).

At the same time, a solution or suspension, preferably an aqueous solution or suspension, of a diazotizing agent, preferably NaNO$_2$ or nitrosylsulfuric acid, is continuously introduced into the microreactor (reactant stream B). In the microreactor, reactant streams A and B are continuously mixed with each other and reacted to form a diazonium salt.

The azo coupling with the above-defined coupling component can be effected in a conventional manner.

When the azo coupling is carried out in a microreactor, a solution or suspension of a diazonium salt (reactant stream C) and a solution or suspension of a coupling component (reactant stream D) are continuously introduced into the microreactor and continuously mixed and reacted with each other therein.

The azo coupling is preferably carried out in aqueous solution, but it is also possible to use organic solvents, if appropriate mixed with water, for example aromatic hydrocarbons, hydrochlorocarbons, glycol ethers, nitrites, esters, dimethylformamide, dimethylacetamide, tetramethylurea and N-methylpyrrolidone.

The azo coupling produces an azocarboxylic acid or azodicarboxylic acid which is converted into an azocarbonyl chloride or azodicarbonyl dichloride in the next step.

When the acyl chloride formation is carried out in a microreactor, the azocarboxylic acid or azodicarboxylic acid is preferably dissolved or suspended in an inert organic solvent, for example chlorobenzene, dichlorobenzene or nitrobenzene, and the solution or suspension obtained is continuously introduced into the microreactor (reactant stream E). At the same time, an inorganic acyl chloride, preferably thionyl chloride, optionally diluted in the same solvent as the acyl chloride, is continously introduced into the microreactor (reactant stream F). In the microreactor, reactant streams E and F are continuously mixed and reacted with each other.

In the next step, about 2 equivalents of the azocarbonyl chloride are condensed with about one equivalent of an aromatic diamine of the formula H$_2$N—Ar—NH$_2$, or about one equivalent of the azodicarbonyl dichloride is reacted with about 2 equivalents of an aromatic amine of the formula H$_2$N—Ar', where
Ar' is for example 2-methyl-3-chlorophenyl, 2-methyl-5-chlorophenyl or 2-(4'-chlorophenoxy)-5-trifluoromethylphenyl. The condensation reaction is preferably effected in an inert organic solvent, preferably in the same solvent as the carbonyl chloride formation, for example in dichlorobenzene. The condensation reaction is effected according to the invention by a solution or suspension of an azocarbonyl chloride or of an azodicarbonyl dichloride (reactant stream G) and a solution or suspension of an aromatic diamine or of an aromatic amine (reactant stream H) being continuously introduced into the microreactor and continously mixed with each other and reacted in the microreactor.

For the purposes of the present invention, the four steps of diazotization, azo coupling, acyl chloride formation and condensation may each be effected in (successive) microreactors, or one, two or three of these steps are carried out in a conventional manner. For example, only the condensation reaction is carried out in a microreactor or the acyl chloride formation is carried out in a microreactor and the condensation is carried out in a conventional manner. It is also possible to use microreactors having two or more reaction zones for the individual reaction steps.

The process steps mentioned may be followed by an aftertreatment of the disazo condensation pigment by heating in the reaction suspension or, if appropriate, after intermediate isolation in the same or another solvent.

A microreactor is constructed from a plurality of laminae which are stacked and bonded together and whose surfaces bear micromechanically created structures which interact to form spaces for chemical reactions. The system contains at least one continuous channel connected to the inlet and the outlet.

The flow rates of the material streams are limited by the apparatus, for example by the pressures which result depending on the geometry of the microreactor. It is desirable for the reaction to take place completely in the microreactor, but it is also possible to adjoin a delay zone to create a delay time that may be required.

The flow rates are advantageously between 0.05 and 5 l/min, preferably between 0.05 and 500 ml/min, particularly preferably between 0.05 and 250 ml/min, especially between 0.1 and 100 ml/min.

A microreactor useful for preparing disazo condensation pigments is described in FIG. 1 by way of example.

The present microreaction system is constructed from six microstructured metal laminae, stacked and bonded together, plus a lid plate (DP) and a base plate (BP) to form a processing module that is firmly held or bonded together to compress sealing sheets between the plates.

The present microreaction system includes two heat exchangers for cooling and/or heating medium, a mixing zone for mixing the reactants and a short delay zone.

The heat exchanger (W1) preheats the reactant streams flowing separately into plate (E). The reactant streams are then mixed within the plates (M), which form a conjoint space. The delay zone (R) brings the reaction mixture to the desired reaction temperature with the aid of the heat exchanger (W2), so that the desired chemical reaction can take place.

The microreaction system is operated continuously, and the fluid quantities which are mixed with each other in each case are in the microliter ($\mu l$) to milliliter (ml) region.

The dimensions of the microstructured regions within the reactor are decisive for preparing disazo condensation pigments in this microreaction system. These dimensions have to be sufficiently large that, in particular, solid particles can pass through without problem and so do not clog up the channels. The smallest clear width of the microstructures should be about ten times larger than the diameter of the largest pigment particles. Furthermore, it has to be ensured, by appropriate geometric styling, that there are no dead water zones, for example dead ends or sharp corners, where for example pigment particles could sediment. Preference is therefore given to continuous paths having round corners if any. The structures have to be sufficiently small to exploit the intrinsic advantages of microreaction technology, namely excellent heat control, laminar flow, diffuse mixing and low internal volume.

The clear width of the solution- or suspension-ducting channels is advantageously 5 to 10 000 $\mu$m, preferably 5 to 2 000 $\mu$m, particularly preferably 10 to 800 $\mu$m, especially 20 to 700 $\mu$m.

The clear width of the heat exchanger channels depends primarily on the clear width of the liquid- or suspension-ducting channels and is advantageously not 15 more than 10 000 $\mu$m, preferably not more than 2 000 $\mu$m, especially not more than 800 $\mu$m. The lower limit of the clear width of the heat exchanger channels is uncritical and is at most constrained by the pressure increase of the heat exchanger fluid to be pumped and by the necessity for optimum heat supply or removal.

The dimensions of the microreaction system used are:

| Heat exchanger structures: | channel width | ~600 $\mu$m |
|---|---|---|
| | channel height | ~250 $\mu$m |
| Mixer and delay time: | channel width | ~600 $\mu$m |
| | channel height | ~500 $\mu$m |

The six superposed and closely conjoined metal laminae are preferably supplied with all heat exchanger fluids and reactants from above. The product and the heat exchanger fluids are preferably likewise removed upwardly. The possible supply of third and fourth liquids involved in the reaction eg. catalysts used in the acylchloride formation is realized via a T-junction located directly upstream of the reactor, ie. one reactant can be premixed with the other liquids involved in the reaction. The requisite concentrations and flows are preferably controlled via precision piston pumps and a computer-controlled control system. The reaction temperature is monitored via integrated sensors and monitored and controlled with the aid of the control system and of a thermostat/cryostat.

The preparation of mixtures to form input material streams may also be carried out in advance in micromixers or in upstream mixing zones. It is also possible for input materials to be metered into downstream mixing zones or into downstream micromixers or -reactors.

The system used here is made of stainless steel; other materials, for example glass, ceramic, silicon, plastics or other metals, may also be used.

Diazotizations are carried out at temperatures of –10 to +80° C., preferably –5 to +30° C., and azo couplings at 0 to 90° C., preferably at 10 to 60° C.

For both the diazotization and the azo coupling, the reactant streams may be admixed with buffer solutions, preferably of organic acids and salts thereof, for example acetic acid/acetate buffer, citric acid/citrate buffer, or of inorganic acids and salts thereof, for example phosphoric acid/phosphate or carbonic acid/carbonate.

Target temperatures for forming the azocarbonyl chloride or azodicarbonyl dichloride range from 20 to 160° C., preferably from 80° C. to 120° C., while target temperatures for the condensation range from 20 to 250° C., preferably from 80 to 200° C.

For both the acyl chloride formation and the condensation, the input material streams may be admixed with solutions which preferably contain reaction catalysts, for example N,N-dimethylformamide or pyridine in the case of acyl chloride formation.

The process of the invention provides high reaction rates due to significantly higher reaction temperatures than, for example, in the batch process. A further advantage is the suppression of incomplete reactions which lead to an increased fraction of monoazo compounds in the end product. The high heat transfer rate during the short residence time in the micro- or minoreactor makes it possible to subject the reactants to a short thermal stress within a narrowly defined time window.

The process of the invention provides disazo condensation pigments. It may also be used to provide mixtures of disazo condensation pigments.

It is surprising and was unforeseeable that the production of disazo condensation pigments would be possible in this technically elegant way, since it was hitherto assumed that the production of solids in a microreactor would cause the system to clog up.

The disazo condensation pigments prepared according to the invention are useful for pigmenting macromolecular organic materials of natural or synthetic origin, for example plastics, resins, coatings, paints or electrophotographic toners and developers and also inks, including printing inks.

EXAMPLES

Example 1

Preparation of C.I. Pigment Red 214 a) Preparation of Acyl Chloride 36.1 g of the dry monoazocarboxylic acid obtained by conventional batch coupling or coupling in a microreactor of conventionally or microreactor-diazotized 2,5-dichloroaniline and 2-hydroxynaphthalene-3-carboxylic acid are heated in 280 ml of 1,2-dichlorobenzene and 18 g of thionyl chloride at 110° C. for 4 h with stirring. This is followed by cooling down to 80° C. and the distillative removal of excess thionyl chloride under reduced pressure, together with a little 1,2-dichlorobenzene.

b) Condensation in a Microreactor

The acyl chloride suspension obtained from a) is adjusted to a volume of 300 ml with 1,2-dichlorobenzene and stirred at 80° C. 8.9 g of 1,4-diamino-2,5-dichlorobenzene are dissolved in 200 ml of 1,2-dichlorobenzene, the volume is then adjusted with 1,2-dichlorobenzene to 300 ml and the solution is stirred at 80° C. The suspension of the acyl chloride and the solution of the diamine are then pumped into the respective reactant inlets of the microreactor by calibrated piston pumps at a flow rate of 6 ml/min in each case. The actual condensation reaction takes place in the reactor space. The heat exchanger circuit of the microreactor is connected to a thermostat which ensures a reaction temperature of 180° C. The pigment suspension emerging from the reactor is collected in a flask, filtered off with suction and washed with hot 1,2-dichlorobenzene, then with methanol and lastly with water and dried at 80° C. under reduced pressure.

Example 2

Preparation of C.I. Pigment Red 214 a) Preparation of Acyl Chloride in a Microreactor 36.1 g of the dry monoazocarboxylic acid obtained by conventional batch coupling or coupling in a microreactor of conventionally or microreactor-diazotized 2,5-dichloroaniline and 2-hydroxynaphthalene-3-carboxylic acid are suspended in 250 ml of 1,2-dichlorobenzene and the suspension is adjusted to 300 ml with 1,2-dichlorobenzene. This suspension is pumped by a calibrated piston pump through reactant inlet A) of the microreactor at a flow rate of 6 ml/min. 18 g of thionyl chloride are adjusted to a volume of 150 ml with 1,2-dichlorobenzene and concurrently pumped by a calibrated piston pump into reactant inlet B) of the microreactor at a flow of 3 ml/min. The actual acyl chloride formation takes place in the reactor space. The heat exchanger circuit of the microreactor is connected to a thermostat which ensures a reaction temperature of 120° C. The product suspension emerging from the reactor is collected in a flask and excess thionyl chloride is distilled off under reduced pressure.

b) Condensation in a Microreactor Identical to Example 1b).

Example 3

Preparation of C.I. Pigment Yellow 93 a) Preparation of Acyl Chloride in a Microreactor 34.5 g of the dry disazodicarboxylic acid obtained by conventional batch coupling or coupling in a microreactor of 2 equivalents of diazotized 3-amino-4-chlorobenzene and 1 equivalent of 1-chloro-2,5-bisacetoacetylamino-4-methylbenzene are suspended in 1,2-dichlorobenzene, the volume being adjusted to 300 ml. This suspension is pumped by a calibrated piston pump via reactant inlet A of the microreactor at a flow rate of 6 ml/min. 18 g of thionyl chloride are adjusted with 1,2-dichlorobenzene to a volume of 150 ml and concurrently pumped by a calibrated piston pump into reactant inlet B of the microreactor at a flow rate of 3 ml/min. The actual acyl chloride formation takes place in the reactor space. The heat exchanger circuit of the microreactor is connected to a thermostat which ensures a reaction temperature of 110° C. The product suspension emerging from the reactor is collected and cooled down to 80° C., and then excess thionyl chloride is distilled off under reduced pressure together with a little 1,2-dichlorobenzene. At the end, 1,2-dichlorobenzene is used to adjust to a volume of 300 ml.

b) Condensation with 3-chloro-2-methylaniline in a microreactor

The acyl chloride suspension obtained from a) and 14.2 g of 3-chloro-2-methylaniline dissolved in 300 ml of 1,2-dichlorbenzene are each heated to 80° C. and pumped by calibrated piston pumps into the respective reactant inlets of the microreactor at a flow rate of 6 ml/min in each case. The actual condensation reaction takes place in the reactor space. The heat exchanger circuit of the microreactor is connected to a thermostat which ensures a reaction temperature of 180° C. The pigment suspension emerging from the reactor is collected in a flask, filtered off with suction and washed with hot 1,2-dichlorobenzene, then with methanol and lastly with water and dried at 80° C. under reduced pressure.

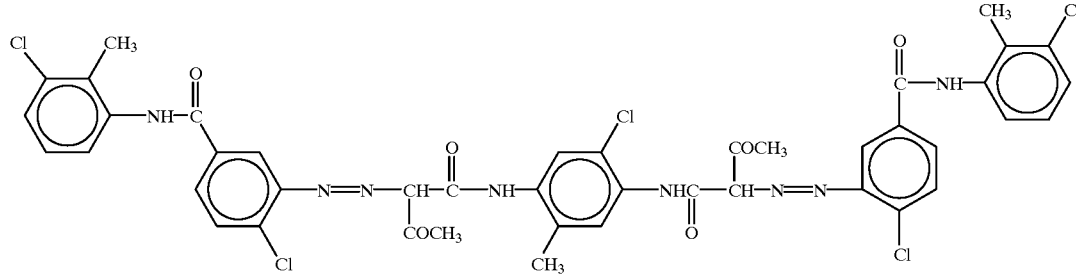

What is claimed is:

1. A process for preparing disazo condensation pigments by diazotization of an aromatic amine, azo coupling with a coupling component to form an azocarboxylic acid or azodicarboxylic acid, formation of an azocarbonyl chloride or azodicarbonyl dichloride and condensation of the azocarbonyl chloride with an aromatic diamine or of the azodicarbonyl dichloride with an aromatic amine, which comprises effecting the acyl chloride formation and/or the condensation and optionally the diazotization and optionally the azo coupling in a microreactor.

2. The process of claim 1 wherein the disazo condensation pigment is a compound of formula (1) or (2)

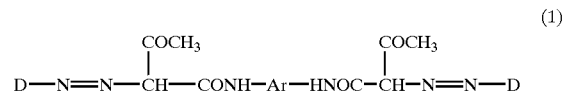

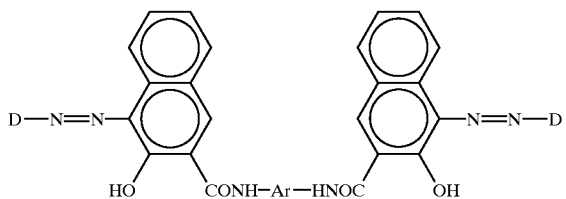

(2)

where
D is a radical of a diazo component and
Ar is an aromatic radical.

3. The process of claim 2 wherein
D is a radical of the formula (a) or (b)

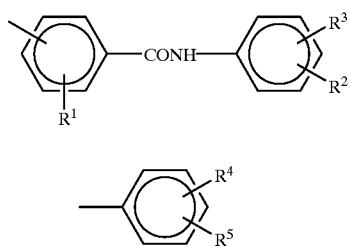

where
R$^1$, R$^2$ and R$^3$ are identical or different and are each selected from the group consisting of hydrogen, methyl, chlorine, CF$_3$ and 4'-chlorophenoxy;
R$^4$ and R$^5$ are identical or different and are each selected from the group of hydrogen, chlorine, methyl, CF$_3$, COOCH$_2$CH$_2$Cl, COO(C$_1$–C$_4$)alkyl and nitro.

4. The process of claim 2 wherein
Ar is 1,4-phenylene, 2-chloro-5-methyl-1,4-phenylene, 2,5-dichloro-1,4-phenylene, 2,5-dimethyl-1,4-phenylene, 2-chloro-1,4-phenylene, 2,2'-dichloro-1,4-biphenylene, benzanilide-4,4'-diyl, 1,4-biphenylylene or 1,4-naphthylene.

5. The process of claim 1 wherein the disazo condensation pigment is C.I. Pigment Yellow 93, 94, 95, 128, 166; C.I. Pigment Orange 31, 55; C.I. Pigment Red 139, 140, 141, 143, 144, 166, 214, 217, 218, 220, 221, 242, 248, 262; C.I. Pigment Brown 23 or 42.

6. The process of claim 1 wherein the diazotization is effected in the microreactor by the amine to be diazotized or its ammonium salt and also a solution or suspension of a diazotizing agent being continuously introduced into the microreactor and continuously mixed with each other and reacted in the microreactor.

7. The process of claim 1 wherein the azo coupling is effected in the microreactor by a solution or suspension of a coupleable diazonium salt and also a solution or suspension of an azo coupling component being continuously introduced into the microreactor and continuously mixed with each other and reacted in the microreactor.

8. The process of claim 1 wherein the acyl chloride formation is effected in the microreactor by a solution or suspension of azocarboxylic acid or of an azodicarboxylic acid in an organic solvent and also an inorganic acyl chloride being continuously introduced into the microreactor and continuously mixed with each other and reacted in the microreactor.

9. The process of claim 1 wherein the condensation reaction is effected in the microreactor by a solution or suspension of an azocarbonyl chloride or of an azodicarbonyl dichloride and a solution or suspension of an aromatic diamine or of an aromatic amine being continuously introduced into the microreactor and continously mixed with each other and reacted in the microreactor.

10. The process of claim 1 wherein two or more of diazotization, azo coupling, acyl chloride formation and condensation reaction are effected using two or more microreactors connected in series or microreactors having two or more reaction zones.

11. The process of claim 1 wherein the introduced solutions or suspensions are brought to the reaction temperature in the microreactor by means of one or more heat exchangers.

12. The process of claim 1 wherein the concentrations, flow rates and temperatures are captured and controlled via sensors and control circuits integrated in the microreactor.

* * * * *

UNITED STATES PATENT AND TRADEMARK OFFICE
CERTIFICATE OF CORRECTION

PATENT NO. : 6,437,104 B1
DATED : August 20, 2002
INVENTOR(S) : Uwe Nickel, Klaus Kund and Frank Alfter It is certified that error appears in the above-identified patent and that said Letters Patent is hereby corrected as shown below:

<u>Title page,</u>
Item [73], Assignee, should read:
-- [73]   Assignee: Clariant International Ltd., Muttenz, (CH) --.

Signed and Sealed this

Eighteenth Day of March, 2003

JAMES E. ROGAN
*Director of the United States Patent and Trademark Office*